United States Patent

Murakami

[11] Patent Number: 6,044,790
[45] Date of Patent: Apr. 4, 2000

[54] MANUAL OPERATING APPARATUS FOR AN AUTOMATIC TRANSMISSION

[75] Inventor: Takao Murakami, Kosai, Japan

[73] Assignee: Fujikiko Kabushiki Kaisha, Tokyo, Japan

[21] Appl. No.: 09/013,015

[22] Filed: Jan. 26, 1998

[30] Foreign Application Priority Data

Jan. 31, 1997 [JP] Japan ................................ 9-019034

[51] Int. Cl.$^7$ .................................................... G01D 11/00
[52] U.S. Cl. .............................. 116/28.1; 116/DIG. 20; 362/491
[58] Field of Search ................. 116/28.1, DIG. 20; 362/491, 543, 544, 235, 240

[56] References Cited

U.S. PATENT DOCUMENTS

| | | | |
|---|---|---|---|
| 2,549,096 | 4/1951 | Jacobi | 116/28.1 |
| 3,985,095 | 10/1976 | Nurse | 116/28.1 |
| 4,798,160 | 1/1989 | Mochida et al. | 116/28.1 |
| 4,991,535 | 2/1991 | Kobayashi | 116/28.1 |
| 5,009,128 | 4/1991 | Seidel et al. | 74/866 |
| 5,159,892 | 11/1992 | Hara et al. | 116/28.1 |
| 5,532,908 | 7/1996 | Yokoyama et al. | 116/28.1 |
| 5,552,761 | 9/1996 | Kazyaka | 116/28.1 |

FOREIGN PATENT DOCUMENTS

| | | |
|---|---|---|
| 0 361 011 | 7/1989 | European Pat. Off. . |
| 296 06 501 U1 | 4/1996 | Germany . |
| 56-60114 | 5/1981 | Japan . |
| 59-110232 | 7/1984 | Japan . |
| 63-38099 | 10/1988 | Japan . |
| 63-188719 | 12/1988 | Japan . |
| 2-39866 | 10/1990 | Japan . |
| 2-39867 | 10/1990 | Japan . |
| 4-53481 | 12/1992 | Japan . |
| 5-34426 | 8/1993 | Japan . |
| 7-317889 | 12/1995 | Japan . |
| 081192653 | 7/1996 | Japan . |

Primary Examiner—Diego Gutierrez
Assistant Examiner—Faye Francis
Attorney, Agent, or Firm—Thomas, Kayden, Horstemeyer & Risley

[57] ABSTRACT

A manual operating apparatus for an automatic transmission is structured such that a first shift line (L1) and a second shift line (L2) corresponding to a shift direction of a shift lever (2) are disposed side by side and that the shift lever (2) can move to the first shift line (L1) and to the second shift line (L2) with respect to each other. In the manual operating apparatus for an automatic transmission, when the shift lever (2) is positioned in the first shift line (L1), a portion along the first shift line L1 is lighted up, and when the shift lever (2) is positioned in the second shift line (L2), a portion along the second shift line (L2) is lighted up.

2 Claims, 4 Drawing Sheets

MANUAL OPERATING APPARATUS FOR AN AUTOMATIC TRANSMISSION

BACKGROUND OF THE INVENTION

1. Field of the Invention

The present invention relates to a manual operating apparatus for an automatic transmission, in particular to a manual operating apparatus for an automatic transmission which is structured such that a first shift line and a second shift line are disposed side by side as a shift direction for a shift lever and a shift lever moves to the first shift line and the second shift line with respect to each other.

2. Description of the Related Art

Some manually operating apparatus for an automatic transmission of a vehicle which includes the gear shift lever are structured such that there are two parallel lines followed by the lever. The shift lever is moved along a first shift line, thereby obtaining a control position, for example, a P position (a parking position), an R position (a reverse position), an N position (a neutral position), a D position (a drive position) and the like, and the shift lever is moved, for example, from the D position to a second shift line so that the shift lever is moved along the second shift line, thereby freely selecting a reduction ratio such as a first speed ratio and a second speed ratio by manual feeling.

However, in the conventional manual operating apparatus for an automatic transmission mentioned above, there has been a problem of whether the shift lever is currently located at a position in the first shift line in a position of the second shift line. The positioned of the shift lever is difficult to distinguish in the case of a dark cabin such as during night operation of the vehicle.

SUMMARY OF THE INVENTION

The present invention has been achieved with such points in view. It therefore is the object of the present invention to provide a manual operating apparatus for an automatic transmission in which it can be easily distinguished whether a shift lever is positioned at a position of a first shift line or a position of a second shift line even in the case that the cabin of the vehicle is dark.

According to a first aspect of the present invention, there is provided a manual operating apparatus for an automatic transmission comprising: a first groove disposed along a first shift line of a shift lever; a second groove located at a side of the first groove and disposed along a second shift line of the shift lever; and a third groove disposed in such a manner that the shift lever moves between the first shift line and the second shift line reciprocatingly, wherein the first groove is clarified by lighting up when the shift lever is positioned at the first shift line; and wherein the second groove is clarified by lighting up when the shift lever is positioned at the second shift line.

In accordance with the first aspect of the invention, the first groove is lighted up when the shift lever is positioned in the first shift line and the second groove is lighted up when the shift lever is positioned in the second shift line, even in the case that the cabin is dark during the vehicle runs at night. Whether the shift lever is positioned at a position of the first shift line or a position of the second shift line can be easily distinguished.

According to a second aspect of the present invention, as it depends from the first aspect, a first lighting device disposed in a peripheral edge portion of the first groove lights up in such a manner as to clarify the first groove and a second lighting device disposed in a peripheral edge portion of the second groove lights up in such a manner as to clarify the second groove.

In accordance with the second aspect of the invention, since the peripheral edge portion of the first groove shines by the first lighting device when the shift lever is positioned in the first shift line and the peripheral edge portion of the second groove shines by the second lighting device when the shift lever is positioned in the second shift line, the position of the shift lever can be more clearly recognized.

According to a third aspect of the present invention, as it depends from the second aspect, the manual operating apparatus for an automatic transmission further comprises: a position detecting device detecting whether the shift lever is positioned at the first shift line or at the second shift line, wherein the first lighting device comprises a first light guiding device disposed in the peripheral edge portion of the first groove and a first light source supplying a light to the first light guiding device; wherein the second lighting device comprises a second light guiding device disposed in the peripheral edge portion of the second groove and a second light source supplying a light to the second light guiding device; and wherein the light source disposed in the selected shift line which is detected by the position detecting device emits a light.

In accordance with the third aspect of the invention, since the respective light from the first light source and the second light source is supplied to the respective peripheral edge portions of the first groove and the second groove by using the first light guiding device and the second light guiding device, the light can be efficiently transmitted and the respective peripheral edge portions of the first groove and the second groove can be uniformly lighted up.

According to a fourth aspect of the present invention, there is provided a manual operating apparatus for an automatic transmission in which a first shift line and a second shift line are disposed side by side as a shift direction for a shift lever. The shift lever is structured such as to move to the first shift line and to the second shift line with respect to each other. A select slide plate moves to the first shift line and to the second shift line together with the shift lever, and the select slide plate has an oblong hole with the shift lever inserted therethrough. A first opening portion and a second opening portion are laterally disposed with respect to the oblong hole; and a light guiding device is disposed in a lower side of the select slide plate and having a first light emitting portion and a second light emitting portion guiding upward a light emitting from a light source. A first lens for lighting up a portion along the first shift line is disposed in an upper side of the select slide plate, the first lens has a circular convex portion disposed in the first lens. The circular convex portion opposes the first light emitting portion of the light guiding device through the select slide plate and introduces a light passing through the first opening portion of the select slide plate from the first light emitting portion. A second lens for lighting up a portion along the second shift line is disposed in an upper side of the select slide plate, with the second lens having a circular convex portion disposed in the second lens, the circular convex portion opposing the second light emitting portion of the light guiding device through the select slide plate and introducing a light passing through the second opening portion of the select slide plate from the second light emitting portion. The first opening portion of the select slide plate is positioned at an opposing position between the first light emitting portion and the circular convex portion when the shift lever is disposed on the first shift line. The second opening portion of the select slide plate is positioned at an opposing position between the second light emitting portion and the circular convex portion when the shift lever is disposed on the second shift line.

In accordance with the fourth aspect of the invention, since the light guiding device and the light source each include one unit, a switch or the like for switching the light source is not required, and the number of the parts can be reduced and the cost can be reduced. Further, since the switch and the like are not required, durability can be improved.

According to a fifth aspect of the present invention, as it depends from one aspect among the first aspect to the fourth aspect, a color of the light in the side of the first shift line and a color of the light in the side of the second shift line are different from each other.

In accordance with the fifth aspect of the invention, since the color of the light in the first shift line and the color of the light in the second shift line are constituted by a different structure, the position of the shift lever can be more clearly recognized.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 4:
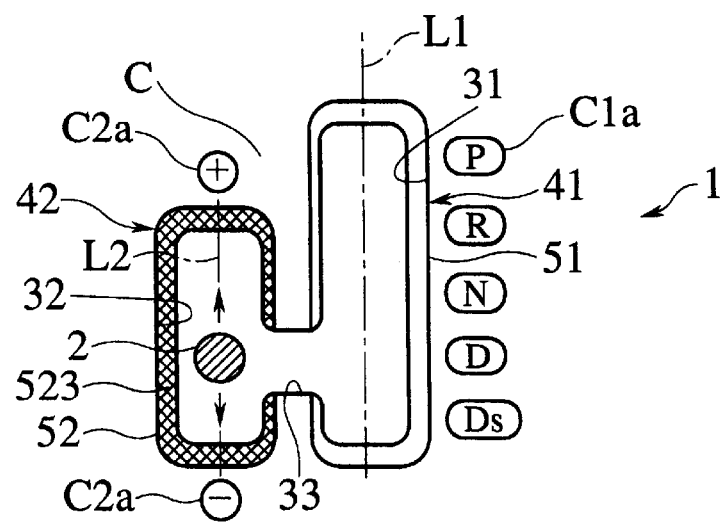
FIG. 4 is a plan view which shows a main portion of the function of the manual operating apparatus for an automatic transmission in another operating state.
Figure 5:
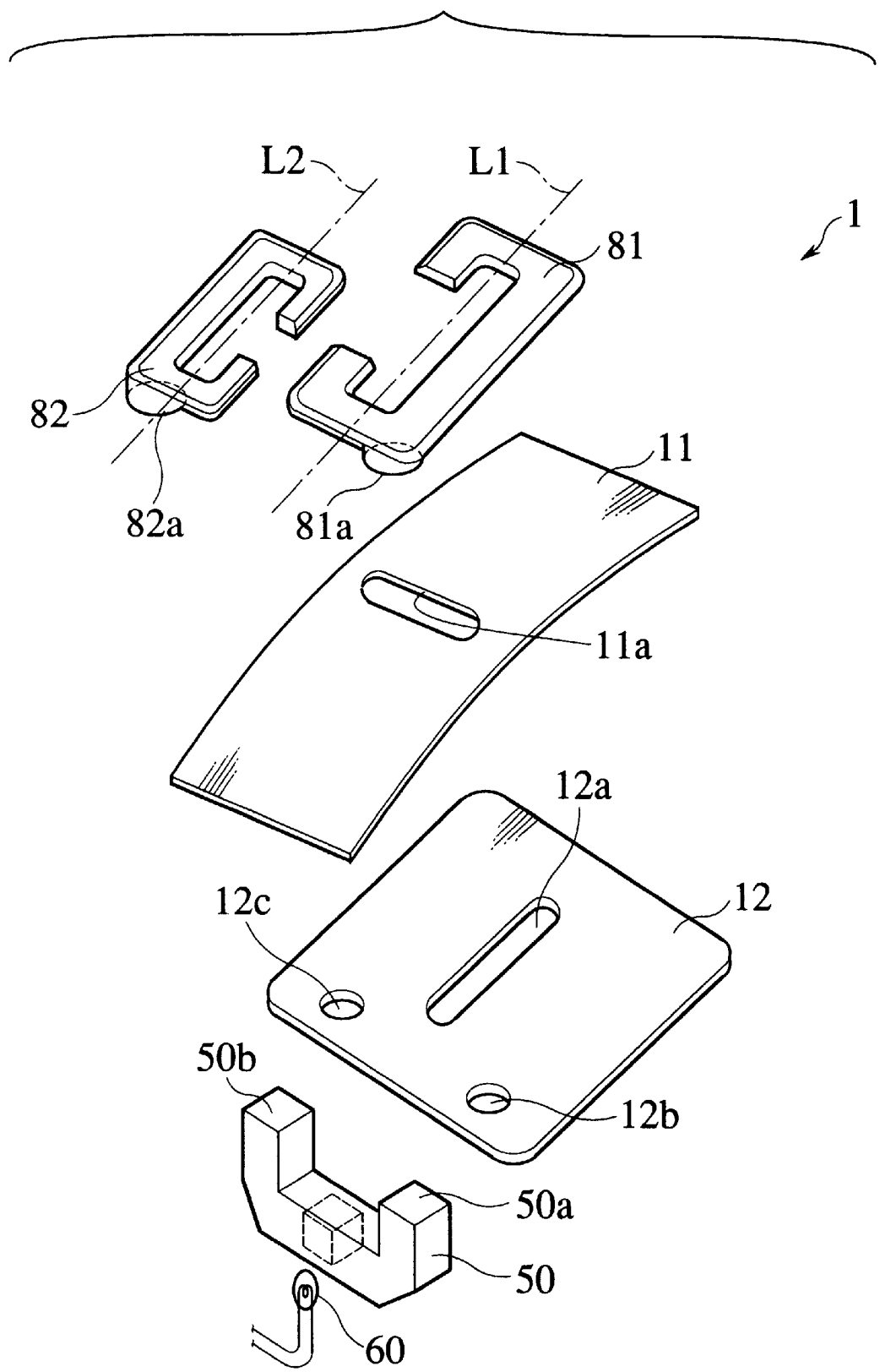
FIG. 5 is an exploded perspective view which shows a main portion of a manual operating apparatus for an automatic transmission in accordance with a second embodiment of the present invention.
Figure 6:
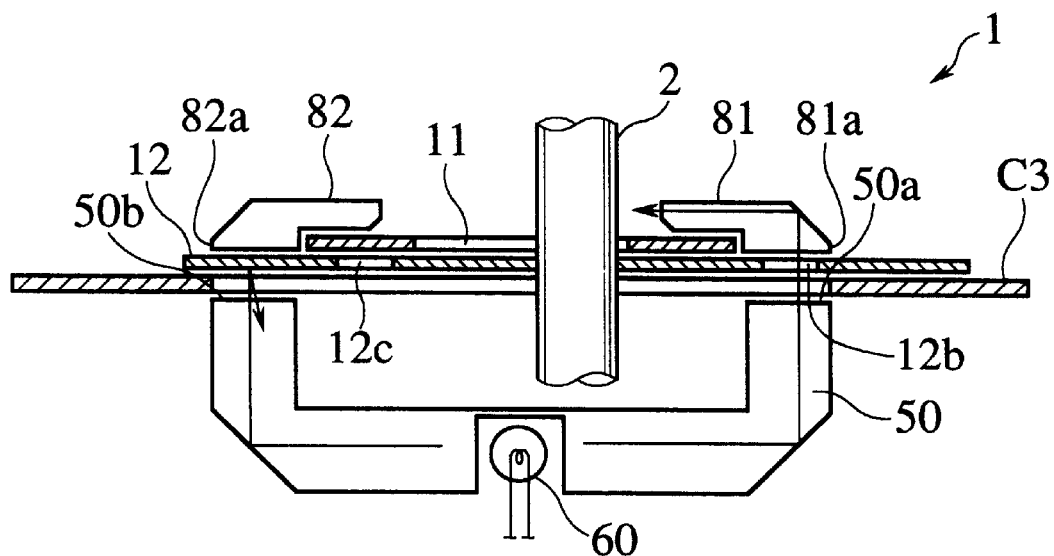
FIG. 6 is a cross sectional view which shows a main portion of a function of the manual operating apparatus for an automatic transmission.
Figure 7:
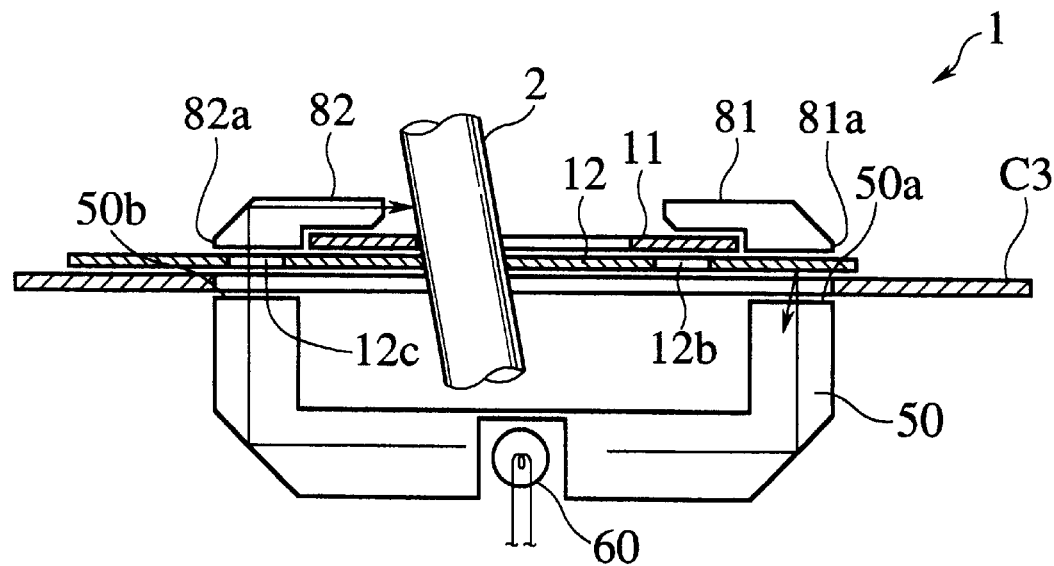
FIG. 7 is a cross sectional view which shows the main portion of a function of the manual operating apparatus for an automatic transmission in another operating state.

There will be detailed below the preferred embodiments of the present invention with reference to the accompanying drawings. Like members are designated by like reference characters. In this case, FIGS. 1 to 4 show a first embodiment and FIGS. 5 to 7 show a second embodiment.

At first, a first embodiment will be described below with reference to FIGS. 1 to 4. A manual operating apparatus 1 for an automatic transmission as shown in this embodiment is provided in an automotive vehicle, and comprises a first groove 31 disposed along a first shift line L1 of a shift lever 2, a second groove 32 positioned beside the first groove 31 in a parallel manner and disposed along a second shift line L2 of the shift lever 2, and a third groove 33 disposed in such a manner that the shift lever 2 can move between the first shift line L1 and the second shift line L2 The first groove 31, the second groove 32 and the third groove 33 are formed in an upper surface cover C which is colored and has a non-permeability for light.

The structure is made such that when the shift lever 2 is positioned in the first shift line L1, the light is emitted so as to illuminate and clarify the first groove 31, and when the shift lever 2 is positioned in the second shift line L2, the light is emitted so as to illuminate and clarify the second groove 32.

Accordingly, it is structured such that a first lighting device 41 provided in a peripheral edge portion of the first groove 31 lights up so as to clarify the first groove 31 and a second lighting device 42 provided in a peripheral edge portion of the second groove 32 lights up so as to clarify the second groove 32.

The first lighting device 41 is disposed in the peripheral edge portion of the first groove 31 and is provided with a first light guiding device 51 for forming the peripheral edge portion and a first electric lamp 61 as a first light source for supplying a light to the first light guiding device 51. The second lighting device 42 is disposed in the peripheral edge portion of the second groove 32 and is provided with a second light guiding device 52 for forming the peripheral edge portion and a second electric lamp 62 as a second light source for supplying a light to the second light guiding device 52.

In the first light guiding device 51, an inner wall surface of the portion for receiving the first electric lamp 61 forms a light receiving surface 511 and is structured such as to guide a light emitted from the first electric lamp 61 to a first light emitting surface 513 formed as a substantially C shape through a reflecting surface 512 and the like. The first light emitting surface 513 is positioned at the peripheral edge portion of the first groove 31 and is structured such as to emit a light introduced from the light receiving surface 511 from a portion between the peripheral edge portion of the first groove 31 of the upper surface cover C and a slide plate 10 sliding together with the shift lever 2.

Further, the first light emitting surface 513 projects inward from the peripheral edge portion of the first groove 31 of the upper surface cover C, so that a driver can directly recognize the first light emitting surface 513 emitting the light and the peripheral edge portion of the first groove 31 can be more clearly lighted up. In this case, the peripheral edge portion of the first light emitting surface 513 is made in such a manner as not to project from the peripheral edge portion of the first groove 31 and the lighting is performed only by the light emitted from the first light emitting surface. Further, in the upper surface cover C, a letter plate C1 including the respective display portions C1a comprising a P position (a parking position), an R position (a reverse position), an N position (a neutral position), a D position (a drive position) and a Ds position (a sporty drive position) is provided. These respective display portions C1a is permeable for a light and is structured such that a letter in each of the positions can be lighted up by the first electric lamp 61.

In the second light guiding device 52, an inner wall surface of the portion for receiving the second electric lamp 62 forms a light receiving surface 521 and is structured such as to guide a light emitted from the second electric lamp 62 to a second light emitting surface 523 formed as a substantially C shape through a reflecting surface 522 and the like. The second light emitting surface 523 is positioned at the peripheral edge portion of the second groove 32 and is structured such as to emit a light introduced from the light receiving surface 521 from a portion between the peripheral edge portion of the second groove 32 of the upper surface cover C and a slide plate 10 sliding together with the shift lever 2. The second light emitting surface 523 projects inward from the peripheral edge portion of the second groove 32 of the upper surface cover C, so that a driver can directly recognize the second light emitting surface 523 emitting the light and the peripheral edge portion of the second groove 32 can be more clearly lighted up. In this case, the peripheral edge portion of the second light emitting surface 523 is made in such a manner as not to project from the peripheral edge portion of the second groove 32 and the lighting is performed only by the light emitted from the second light emitting surface 523.

Then, the first light emitting surface 513 and the second light emitting surface 523 are structured such as to emit the light having the same color.

The slide plate 10 is structured such that a shift slide plate 11 having an oblong hole 11*a* in a select direction and a select slide plate 12 having an oblong hole 12*a* in a shift direction are overlapped, and the shift lever 2 passes through the oblong holes 11*a* and 12*a* in such a manner that the shift slide plate 11 is slid by a shift operation of the shift lever 2 and the select slide plate 12 is slid by a select operation.

Figure 1:
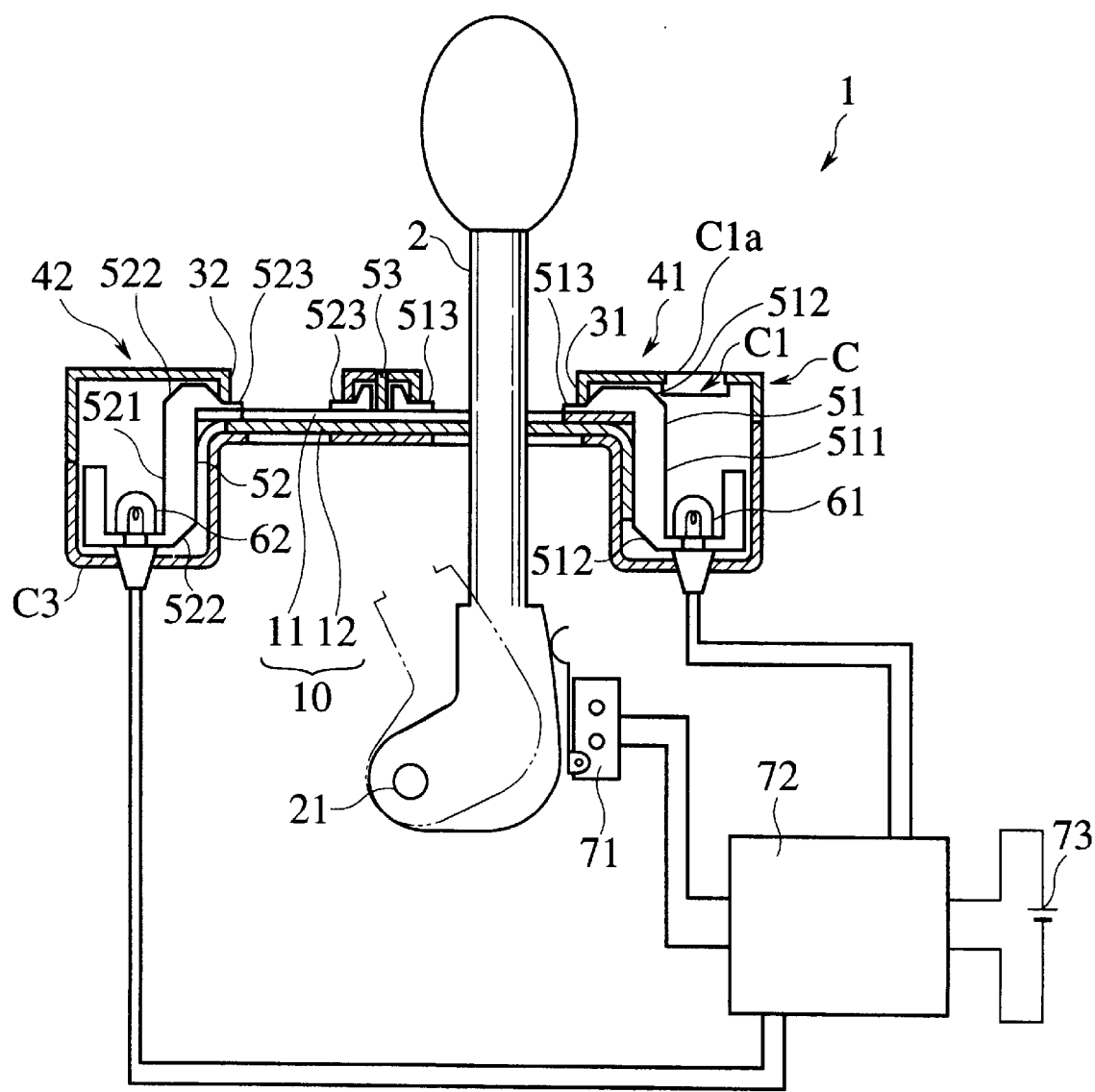
FIG. 1 is a cross sectional view which shows a manual operating apparatus for an automatic transmission in accordance with a first embodiment of the present invention.

The shift lever 2 is structured in such a manner as to move along the first shift line L1 and the second shift line L2, and to rotate around a pin 21 shown in FIG. 1 so as to move to the first shift line L1 and the second shift line L2. Further, at a position near the lower end portion of the shift lever 2, a position detecting switch 71 as a position detecting device which is turned to an ON state when the shift lever 2 is positioned at a position of the first shift line L1 and to an OFF state when the shift lever 2 is positioned at a position of the second shift line L2, is provided.

The position detecting switch 71 is connected to the first electric lamp 61 and the second electric lamp 62 through a controller 72. The controller 72 is structured such as to supply an electricity only to the first electric lamp 61 by detecting the ON state of the position detecting switch 71 and supply an electricity only to the second electric lamp 62 by detecting the OFF state of the position detecting switch 71. In FIG. 1, reference numeral 73 denotes a power source and reference numeral 53 denotes a light shielding rib integrally formed on the upper surface cover C. Further, reference numeral C3 denotes a lower surface cover for covering a lower portion of the first light guiding device 51 and the second light guiding device 52 and is fitted to the upper surface cover C.

Figure 2:
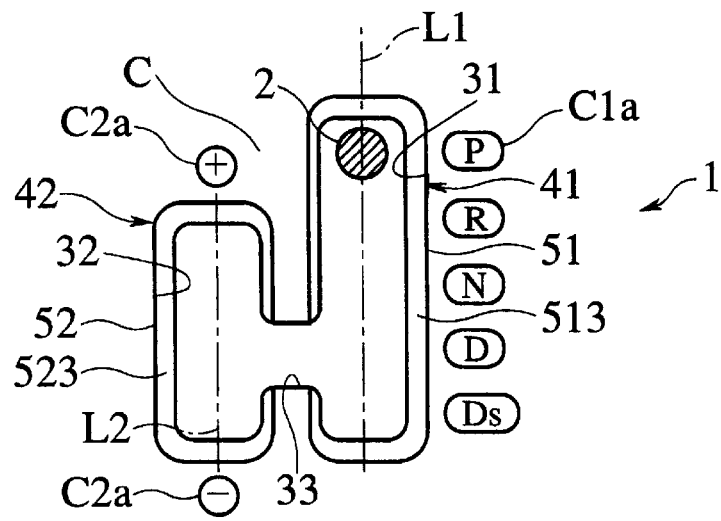
FIG. 2 is a plan view which shows a main portion of the manual operating apparatus for an automatic transmission.
Figure 3:
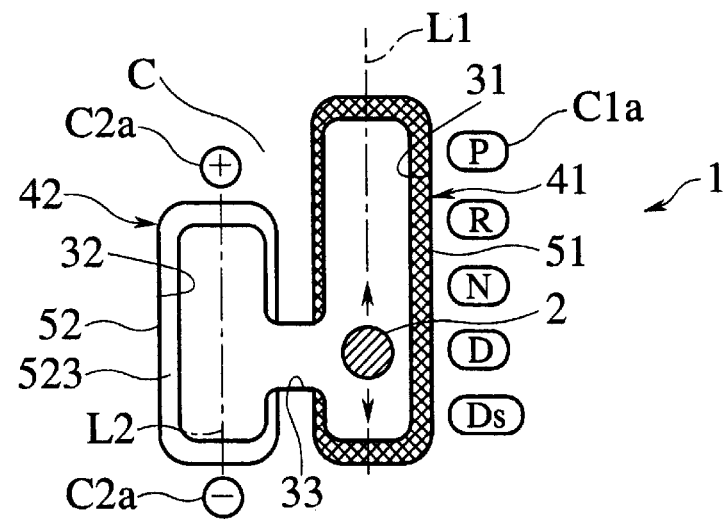
FIG. 3 is a plan view which shows a main portion of a function of the manual operating apparatus for an automatic transmission.

In the manual operating apparatus 1 for an automatic transmission structured in the above manner, when the switch for a small light and the like is turned on at night, in the case that the shift lever 2 is positioned in the first shift line L1, the state becomes from the state shown in FIG. 2 to the state shown in FIG. 3. Namely, the position detecting switch 71 becomes an ON state since the shift lever 2 is disposed in the first shift line L1, so that the first electric lamp 61 is turned on, whereby the peripheral edge portion of the first groove 31 and the respective display portion C1*a* are lighted up.

At a position of the D position, the shift lever 2 can move to a position of the second shift line L2. Accordingly, when the shift lever 2 is moved to the second shift line L2, as shown in FIG. 4, the position detecting switch 71 is turned to the OFF state, so that the first electric lamp 61 is turned off and the second electric lamp 62 is turned on, whereby the peripheral edge portion of the second groove 32 is lighted up. At this time, the first light emitting surface 513 and the respective display portions C1*a* are not lighted up by turning off the first electric lamp 61.

In the second shift line L2, a shift change can be performed in such a manner as a change to a first speed ratio, a change to a second speed ratio and the like in a manual gear shift feeling by moving the shift lever 2 to a plus direction or a minus direction. In this case, it may be structured such that a plus and a minus display portions C2*a* are provided in an upper and lower portions of the second shift line L2, the display portions C2*a* is made permeable for a light and a part of the light of the second light guiding device 52 is introduced, thereby lighting up the display portions C2*a* as shown in FIG. 4.

Further, when the shift lever 2 is moved from the second shift line L2 to the first shift line L1, at this time, the second electric lamp 62 is turned off and the first electric lamp 61 is turned on, so that the peripheral edge portion of the first groove 31 and the respective display portions C1*a* are lighted up.

As mentioned above, in accordance with the manual operating apparatus 1 for an automatic transmission of the first embodiment, even in the case that the cabin is dark such as during a running at night and the like, whether the shift lever 2 is positioned at a position of the first shift line L1 or at a position of the second shift line L2 can be easily distinguished. Further, since all the peripheral edge portions of the first groove 31 and the second groove 32 shine, the position of the shift lever can be clearly recognized.

Further, since the respective lights of the first electric lamp 61 and the second electric lamp 62 are respectively supplied to the first light emitting surface 513 and the second light emitting surface 523 by using the first light guiding device 51 and the second light guiding device 52, the light emitted from each of the electric lamps 61 and 62 can be efficiently transmitted, and the respective peripheral edge portions of the first groove 31 and the second groove 32 can be uniformly lighted up.

Next, a second embodiment in accordance with the present invention will be described below with reference to FIGS. 5 to 7. In this case, the same reference numerals are attached to the same elements as those of the first embodiment, and the explanation thereof will be simplified.

The manual operating apparatus 1 for an automatic transmission in accordance with the second embodiment is structured such that the first shift line L1 and the second shift line L2 corresponding to the shift direction of the shift lever 2 are disposed side by side in a parallel manner and the shift lever 2 can move to the first shift line L1 and the second shift line L2 with respect to each other in a portion of a D position (not shown), as shown in FIGS. 5 to 7.

Further, in the lower surface of the upper surface cover C, a select slide plate 12 moving to the first shift line L1 and to the second shift line L2 together with the shift lever 2 is provided. An oblong hole 12*a* extending to a direction along the first shift line L1 and the second shift line L2 is formed in the select slide plate 12, and the shift lever 2 can move along the oblong hole 12*a*. When the shift lever 2 moves to the first shift line L1 and the second shift line L2 by inserting the shift lever 2 to the oblong hole 12*a*, the select slide plate 12 also moves together with the shift lever 2.

Further, a first opening portion 12*b* and a second opening portion 12*c* each having a circular shape are respectively formed in a right and left portions of the select slide plate 12 with respect to the oblong hole 12*a*.

A substantially U-shaped light guiding device 50 having two light emitting portions for guiding and upward emitting the light of the electric lamp 60 as the light source 60 is provided in the lower side of the select slide plate 12.

A first light emitting portion 50*a* disposed at a position corresponding to the first opening portion 12*b* at a time when the select slide plate 12 moves to the first shift line L1 and a second light emitting portion 50*b* disposed at a position corresponding to the second opening portion 12*c* at a time when the select slide plate 12 moves to the second shift line L2, are formed in the light guiding device 50.

Furthermore, a substantially C-shaped first lens 81 formed along the peripheral edge portion of the first groove 31 at a time when the select slide plate 12 moves to the first shift line L1 together with the shift lever 2 and a substantially C-shaped second lens 82 formed along the peripheral edge portion of the second groove 32 at a time when the select slide plate 12 moves to the second shift line L2 together with the shift lever 2 are provided in the upper side of the select slide plate 12.

A circular convex portion 81*a* opposing to the first light emitting portion 50*a* of the light guiding device 50 through the select slide plate 12 and introducing a light passing through the first opening portion 12*b* of the select slide plate 12 and emitted from the first light emitting portion 50*a* is formed in the first lens 81. Then, the first lens 81 is structured such as to be wholly lighted up by the light introduced from the circular convex portion 81*a*. A circular convex portion 82*a* opposing to the second light emitting portion 50*b* of the light guiding device 50 through the select slide plate 12 and introducing a light passing through the second opening portion 12*c* of the select slide plate 12 and emitted from the second light emitting portion 50*b* is formed in the second lens 82, and the second lens 82 is structured such as to be wholly lighted up by the light introduced from the circular convex portion 82*a*.

Further, the shift slide plate 11 is provided on the upper surface of the select slide plate 12. An oblong hole 11*a* in which the shift lever 2 can move to the first shift line L1 and to the second shift line L2 is formed in the shift slide plate 11. Accordingly, the shift slide plate 11 allows the shift lever 2 to move to the first shift line L1 and to the second shift line L2 by the oblong hole 11*a*, and is structured in such a manner as to cover the oblong hole 12*a* formed in the select slide plate 12.

In the manual operating apparatus 1 for an automatic transmission structured in the above manner, when the shift lever 2 is disposed on the first shift line L1, as shown in FIG. 6, the first opening portion 12*b* is positioned at an opposing position between the first light emitting portion 50*a* and the circular convex portion 81*a*, the light from the first light emitting portion 50*a* passes through the first opening portion 12*b* so as to enter the circular convex portion 81*a*, and lights up the portion along the first shift line L1 by the first lens 81. At this time, the second opening portion 12*c* is positioned at a position shifted from the opposing position between the second light emitting portion 50*b* and the circular convex portion 82*a* and the light from the second light emitting portion 50*b* is in a state of being shielded by the select slide plate 12. Accordingly, the second lens 82 does not emit the light.

On the contrary, when the shift lever 2 is moved to the second shift line L2, the select slide plate 12 also moves to the second shift line L2, so that the second opening portion 12*c* becomes to be concurred with the position where the second light emitting portion 50*b* and the circular convex portion 82*a* is opposing to each other, and the first opening portion 12*b* is shifted from the first light emitting portion 50*a*, whereby the first light emitting portion 50*a* becomes a state of being shielded by the select slide plate 12. Accordingly, the second lens 82 emits the light and the first lens 81 does not emit the light. Therefore, the portion along the second shift line L2 becomes a state of being lighted up by the second lens 82.

Accordingly, also in the manual operating apparatus 1 for an automatic transmission in accordance with the second embodiment, the same effect as that of the first embodiment mentioned above can be obtained. Further, in the manual operating apparatus 1 for an automatic transmission in accordance with this embodiment, since the light guiding device 50 and the light source 60 respectively comprise one unit and a switch for switching the light source 60 is not required, a number of the parts can be reduced and cost can be reduced. Further, since the switch or the like is not required, durability can be improved.

In the first embodiment mentioned above, it is structured such that turning on and off of the first electric lamp 61 and the second electric lamp 62 is controlled by the controller 72, however, the structure may be made such that the turning on and off of the first electric lamp 61 and the second electric lamp 62 is directly controlled by the position detecting switch 71 without using the controller 72. Namely, in this case, it is necessary to structure the position detecting switch 71 in such a manner as to connect between the first electric lamp 61 and the power source 73 at a time when the shift lever 2 is positioned in the first shift line L1 and to connect between the second electric lamp 62 and the power source 73 at a time when the shift lever 2 is positioned in the second shift line L2.

Further, when the shift lever 2 is positioned in the first shift line L1, the respective display portions C1*a* on the letter plate C1 are also lighted up by the first electric lamp 61, however, these respective display portions C1*a* may be structured such as to be always lighted up by the other electric lamp or the like.

On the contrary, in the first embodiment and the second embodiment mentioned above, the color of the light showing that the shift lever 2 is disposed in the first shift line L1 or the second shift line L2 is structured in such a manner as to comprise the same color, however, the color of the light may be structured in such a manner as to comprise a different color between the first shift line L1 side and the second shift line L2 side. The color of the light is determined by the color of the light guiding devices 51 and 52 and the lens 81 and 82. In this case, the position of the shift lever 2 can be more clearly recognized.

Further, in the first embodiment and the second embodiment mentioned above, it is structured such that the lighting is performed by the lens, the light guiding device and the electric lamp, however, it may be structured such that the portion along the first shift line L1 and the second shift line L2 is lighted up by using an optical fiber, an LED (a light emitting diode), VFD (a fluorescent character display tube) and the like.

While preferred embodiments of the present invention have been described using specific terms, such description is for illustrative purposes, and it is to be understood that changes and variations may be made without departing from the spirit or scope of the following claims.

What is claimed is:

1. A manual operating apparatus for an automatic transmission comprising:

a first groove disposed along a first shift line of a shift lever;

a second groove located at a side of the first groove and disposed along a second shift line of the shift lever;

a third groove disposed in such a manner that the shift lever moves between the first shift line and the second shift line reciprocatingly, a first lighting device disposed at a peripheral edge portion of the first groove for clarifying the first groove, and a second lighting device disposed at a peripheral edge portion of the second groove for clarifying the second groove, and a position detecting device for detecting whether the shift lever is positioned at the first shift line or at the second shift line, for alternately actuating either the first or second lighting device, wherein only the lighting device disposed at the first or second groove at the selected shift line emits a light.

2. A manual operating apparatus for an automatic transmission according to claim 1 wherein:

said first lighting device comprises a first light guiding device disposed in the peripheral edge portion of said first groove and a first light source supplying a light to said first light guiding device; and said second lighting device comprises a second light guiding device disposed in the peripheral edge portion of said second groove and a second light source supplying a light to said second light guiding device.

* * * * *